United States Patent
Li (10) Patent No.: US 11,450,876 B2
(45) Date of Patent: Sep. 20, 2022

(54) POROUS ELECTRODE FOR ELECTROCHEMICAL CELLS

(71) Applicant: Wentao Li, Cookeville, TN (US)

(72) Inventor: Wentao Li, Cookeville, TN (US)

(73) Assignee: LiBama, LLC

( * ) Notice: Subject to any disclaimer, the term of this patent is extended or adjusted under 35 U.S.C. 154(b) by 155 days.

(21) Appl. No.: 15/721,719

(22) Filed: Sep. 29, 2017

(65) Prior Publication Data

US 2018/0097251 A1    Apr. 5, 2018

Related U.S. Application Data

(60) Provisional application No. 62/402,932, filed on Sep. 30, 2016.

(51) Int. Cl.

| | |
|---|---|
| *H01M 4/04* | (2006.01) |
| *H01M 4/38* | (2006.01) |
| *H01M 10/00* | (2006.01) |
| *H01M 4/62* | (2006.01) |
| *H01M 50/116* | (2021.01) |
| *H01M 4/02* | (2006.01) |

(52) U.S. Cl.
CPC ......... *H01M 10/00* (2013.01); *H01M 4/0402* (2013.01); *H01M 4/381* (2013.01); *H01M 4/382* (2013.01); *H01M 4/62* (2013.01); *H01M 4/624* (2013.01); *H01M 50/116* (2021.01); *H01M 2004/027* (2013.01)

(58) Field of Classification Search
CPC ...... H01M 10/00; H01M 4/382; H01M 4/381; H01M 4/624; H01M 4/62; H01M 2/0277; H01M 4/0402; H01M 2004/027

USPC .......................................................... 429/229
See application file for complete search history.

(56) References Cited

U.S. PATENT DOCUMENTS

| | | | | |
|---|---|---|---|---|
| 4,056,664 A | * | 11/1977 | Jaffe ...................... | H01M 6/12 429/217 |
| 4,091,176 A | * | 5/1978 | Alfenaar ................. | H01M 4/86 429/522 |
| 5,585,208 A | * | 12/1996 | Lian ......................... | H01G 9/22 252/500 |
| 5,698,339 A | * | 12/1997 | Kawakami .............. | H01M 4/13 429/212 |

(Continued)

FOREIGN PATENT DOCUMENTS

CA        1051510 A1 *  3/1979

*Primary Examiner* — Christian Roldan

(74) *Attorney, Agent, or Firm* — Rockridge Venture Law; Andrew Lerner; Kevin Christopher (57) ABSTRACT

A porous electrode for electrochemical cells, methods of making the same and its application are described. The porous electrode is comprised of a porous conductive layer and an insulating layer, whereas the pores inside the conductive layer function as mini-containers for the active metal for rechargeable batteries, and the insulating material covers the top conductive surface of the conductive layer and blocks the sites where active metal dendrite would otherwise preferentially grow. An example of such electrodes is a porous copper foil with top surface coated with polyvinylene difluoride (PVDF). Electrochemical cells containing the invented electrode, such as rechargeable lithium batteries, sodium batteries and aluminum batteries, have good cycle life and safety performance.

20 Claims, 9 Drawing Sheets

(56) References Cited

U.S. PATENT DOCUMENTS

| | | | | |
|---|---|---|---|---|
| 6,001,139 A | * | 12/1999 | Asanuma | H01M 4/62 |
| | | | | 29/623.3 |
| 2005/0147886 A1 | * | 7/2005 | Mikhaylik | H01M 4/382 |
| | | | | 429/218.1 |
| 2012/0251878 A1 | * | 10/2012 | Ueki | H01M 10/052 |
| | | | | 429/211 |
| 2013/0071751 A1 | * | 3/2013 | Tajima | H01M 4/625 |
| | | | | 429/231.8 |
| 2013/0084495 A1 | * | 4/2013 | Tajima | H01M 4/625 |
| | | | | 429/211 |
| 2014/0295238 A1 | * | 10/2014 | Chae | H01M 4/668 |
| | | | | 429/105 |
| 2017/0301962 A1 | * | 10/2017 | Park | H01M 10/0569 |
| 2019/0081346 A1 | * | 3/2019 | Yun | H01M 4/405 |

\* cited by examiner

POROUS ELECTRODE FOR ELECTROCHEMICAL CELLS

CROSS-REFERENCE TO RELATED APPLICATIONS

This patent application claims a priority date of Sep. 30, 2016 for U.S. provisional patent application 62/402,932 filed on Sep. 30, 2016.

TECHNICAL FIELD

The present application relates generally to the field of electrochemical cells where a metal anode is used or formed, such as rechargeable lithium metal batteries, rechargeable sodium batteries, lithium air batteries, zinc air batteries, and aluminum air batteries. More particularly, this application relates to a conductive porous electrode that has insulating surfaces. The present application also relates to methods of forming such electrodes, electrochemical cells comprising such electrodes, and methods of making such electrochemical cells.

BACKGROUND

With the broader adoption of portable electronic devices and electrified vehicles, there have been considerable need and interest for electrochemical energy storage devices that have higher energy density than state-of-the-art lithium ion batteries. Metal anodes, such as lithium, sodium, zinc, magnesium and aluminum, are particularly attractive as the anode of electrochemical cells because of their high energy density, compared for example to intercalation carbon anodes or even silicon anodes, where the presence of large amount of additional elements increases weight and volume of the anodes, and thereby reduces the energy density of the cells. However, electrochemical cells with metal anodes, such as rechargeable lithium metal batteries, have cycle life and safety problems associated with dendrite formation during the charging process.

Solid polymer electrolyte is one of the current approaches to the dendrite problem. For example, U.S. Pat. Nos. 5,460,905 and 5,462,566 describe a film of an n-doped conjugated polymer interposed between the alkali metal anode and the electrolyte. However, solid polymer electrolyte has low conductivity, which is typically in the range of $10^{-6}$ to $10^{-4}$ S/cm at room temperature. At the same time, the polymer needs to have high enough modulus to be able to resist the dendrite. So there is a dilemma for balancing the high conductivity need and high modulus need. Another approach is to use single ion conductive ceramic, as for example stated in U.S. Patent application Nos. US 20140272524 and US 20150318552, where protective layers of an alkali-ion conducting glassy or amorphous material are described. There remains a need for improved methods which will enable the application of such high energy density electrochemical cells.

SUMMARY OF THE INVENTION

An exemplary electrode of the present invention for use in an electrochemical cell comprises: (i) a porous conductive layer where active metal, such as lithium, sodium, aluminum or zinc, is present or can be incorporated; and (ii) an insulating layer that is made of material that is both electronically and ionically non-conductive, wherein the insulating material partially covers the conductive surface of the above-mentioned porous conductive layer.

The porous conductive layer of an exemplary electrode of the present invention is made of interconnected conductive materials, for example, copper, nickel, lithium, sodium, potassium, cesium, beryllium, magnesium, calcium, titanium, vanadium, iron, carbon, or any combination of conductive materials. Preferably, the conductive material is selected from copper, nickel, iron, carbon or their composites.

The pores in an exemplary porous conductive layer of the present invention are in the form of anything, for example, random shaped space, rectangular prism, hexagonal prism, cylinder, sphere, pyramid or combination of any form. Dimension of the pores close to the insulating layer is particularly important. The average dimension of the pores close to the insulating surface side of the porous conductive electrode is preferably no more than 100 μm ($10^{-6}$ m); more preferably, the average dimension of the pores close to the insulating surface side of the porous conductive layer is no more than 10 μm; still more preferably, the average dimension of the pores close to the insulating surface side of the porous conductive layer is no more than 5 μm. On the other hand, the average dimension of the pores close to the insulating surface side of the porous conductive layer is preferably no less than 1 nm ($10^{-9}$ m); more preferably, the average dimension of the pores close to the insulating surface side of the porous conductive layer is preferably no less than 10 nm. Still more preferably, the average dimension of the pores close to the insulating surface side of the porous conductive layer is no less than 100 nm.

The pores in an exemplary porous conductive layer of the present invention may occupy a significant volume of the porous conductive layer. Preferably, the pore volume is more than 50% of the total volume of the porous conducive layer. More preferably, the pore volume is more than 75% of the total volume of the porous conducive layer.

The pores in an exemplary porous conductive layer of the present invention may be empty, partially filled or filled, with active materials, with liquid electrolyte, with gel electrolyte, with solid electrolyte, with composite electrolyte, or combination of the above materials.

The insulating layer of an exemplary electrode of the present invention is made of non-conductive materials that are both electronically and ionically non-conductive, for example, polymers, oxides, sulfides, fluorides, chloride, nitrides, carbonates, nitrides, silicates, borates, aluminates, sulfates, phosphates, and any combination of the above-mentioned materials. Materials with low conductivity, good adhesion and compatibility with other components of the electrochemical cell are preferred.

Another aspect of the present invention pertains to methods for forming the porous electrodes according to embodiments of the present invention. The layers of an exemplary electrode of the present invention may be formed by any of the methods, such as, but not limited to physical vapor deposition methods, chemical vapor deposition methods, electrostatic spray deposition methods, mechanical forming methods including extrusion, chemical or electrochemical stripping or plating methods, or printing methods including 2D and 3D printing. Low cost methods are generally preferred.

In one embodiment of the present invention, the insulating material covers only the space at the top of the conductive layer, whereas the uncovered top surface area of the conductive material is no more than 50% of the available top surface area of the conductive material. Preferably, the uncovered top surface area of the conductive material is no more than 10% of the available top surface area of the conductive materials. More preferably, the uncovered top surface area of the conductive material is no more than 1% of the available top surface area of the conductive material.

In another embodiment of the present invention, the space containing the insulating material extends to the inside of the conductive layer, whereas thickness of the space containing insulating material covered portion of the conductive layer is preferably less than 100% of the total conductive layer thickness. More preferably, thickness of the insulating material covered portion of the conductive layer is no more than 50% of the total conductive layer thickness.

In one or more embodiments of the present invention, the electrode is incorporated as an anode or part of an anode into an electrochemical cell that includes an anode, a cathode, and an electrolyte.

In one embodiment of the present invention, lithium metal is attached to the porous electrode before being assembled into an electrochemical cell.

In one or more embodiments of the present invention, lithium or sodium metal is deposited in-situ to the porous electrode after the electrode is assembled into an electrochemical cell.

The foregoing examples of related art with limitations related thereto are intended to be illustrative and not exclusive. The plural or singular nouns used may indicate a class of substance or materials without distinction. Other limitations and teachings of the related art will become apparent to those of skill in the art upon a reading of the specification and a study of the drawings.

BRIEF DESCRIPTION OF THE DRAWINGS

FIG. 7 illustrates a cross-sectional view of a porous electrode of an embodiment of the present invention, 1: insulating layer (uncovered top conductive surface may or may not exist); 2: porous conductive layer; Active metal (lithium, zinc, aluminum, sodium, etc.) would be deposited in-situ after assembling of the electrochemical cell. 3: additional current collector.

FIG. 9 illustrate a cross-sectional view of the active material assembly of an electrochemical cell of an embodiment of the present invention. 1: insulating layer, also functions as the separator layer (uncovered top conductive surface may or may not exist); 2: porous conductive layer; active metal (lithium, zinc, aluminum, sodium, etc.) would be deposited in-situ after assembling of the electrochemical cell. The pores may be partially or completely filled with gel electrolyte or solid electrolyte. 6: cathode layer.

DETAILED DESCRIPTION OF CERTAIN EMBODIMENTS

The performance and safety problems caused by dendrite growth of the active metal of a electrochemical cell where a metal anode is used or formed, such as rechargeable lithium metal batteries, rechargeable sodium batteries, lithium air batteries, zinc air batteries, and aluminum air batteries, may, according to the present invention, be solved by the use of a porous conductive electrode comprising an insulating surface layer.

Porous Electrodes

One aspect of the present invention pertains to a porous electrode for use in an electrochemical cell, wherein the porous electrode comprises:

(i) a porous conductive layer where active materials, such as lithium, magnesium, sodium, aluminum or zinc, is present or can be incorporated; and (ii) an insulating layer made of material that is both electronically and ionically non-conductive, wherein the insulating material partially covers the conductive surface of the above porous conductive layer.

The porous electrode of embodiments of the present invention may further comprise other components, for example, additional current collector, gel electrolyte, solid electrolyte, and/or active metal.

Porous Conductive Layer

The porous conductive layer of the electrode of embodiments of the present invention functions as: (i) the current collector, where electric current can flow in and out from; (ii) the substrate, where the active metal can be deposited to or stripped from; and (iii) the container, where the active metal can be contained inside and dendrite growth can be blocked.

The porous conductive layer of the electrode of embodiments of the present invention is made of interconnected conductive material. A conductive material is defined here as any substance that has an electronic conductivity of no less than $10^{-6}$ S/cm at ambient conditions, for example, copper, nickel, sodium, potassium, cesium, beryllium, magnesium, calcium, titanium, vanadium, iron, carbon, conductive polymers, such as doped polythiophenes, conductive ceramics, such as doped indium tin oxide, or any combination of conductive substance. The conductive material may be in any form of shape, such as wire, ribbon, tube, mesh or foam, and be arranged in a regular pattern, in mixed patterns, or in a random fashion. Preferably, the conductive material is selected from copper, nickel, iron, carbon or their composites, and the preferable patterns will be those economical to make, such as random, circular, triangular, and rectangular.

The pores in the porous conductive layer of embodiments of the present invention may occupy a significant volume of the porous conductive layer. Preferably, the pore volume is no less than 50% of the total volume of the porous conducive layer. More preferably, the pore volume is no less than 75% of the total volume of the porous conducive layer.

The thickness of the porous conductive layer is not particularly limited. For practical reasons, the thickness is not to be over 10 cm. For portable electronic applications, the thickness is preferably not to be over 1 cm. For various applications, the thickness can be, for example, 10 cm, 1 cm, 1 mm, 100 µm, 10 µm, 1 µm, 0.1 µm or any number in between.

Insulating Layer

The insulating layer of the electrode of embodiments of the present invention is made of material that is both electronically and ionically non-conductive. "Non-conductive" means very low conductivity, for example, less than $10^{-6}$ S/cm at ambient conditions. The insulating material partially covers the surface of the conductive material of the above porous conductive layer and inhibits preferential deposition and growth of the active metal on the outside surface of the conductive layer while leaving the pores open for the flow of electrolyte and/or ions.

The insulating material that is contained in the insulating layer of the electrode of embodiments of the present invention can be any non-conductive materials, such as polymers, oxides, sulfides, fluorides, chlorides, carbonates, nitrides, silicates, borates, aluminates, sulfates, phosphates and mixed compounds. Mixed compounds are the ones with more than one cation or more than one negatively charged element in its structure, such as $LiAlMgF_4$ and $Li_xPO_yN_z$, $Li_xPO_yF_z$, where x, y, z=⅓, ½, 1, 1.5, 2 or 3, provided the charge is balanced for the formula. Specific examples of the non-conductive material include polyethylene (PE), polypropylene (PP), polystyrene (PS), polytetrafluoroethylene (PTFE), polyvinyldifluoride (PVDF), polyacrylic acid (including its esters) (PAA), polyamide (PA), poly(terephthalate) (PT), LiF, $Li_2O$, $Li_2S$, $Li_2CO_3$, $Li_3PO_4$, $LiPO_2F_2$, $Al_2O_3$, $AlF_3$, $AlPO_4$, $ZnF_2$, $Zn_3(PO_4)_2$ and any combination of the above-mentioned compounds. Material with lower conductivity, good adhesion and compatibility with other components of the electrochemical cell is preferred.

The thickness of the space containing the insulating material depends on the porous conductive layer. Generally speaking, the thickness of the space containing the insulating material is less than the thickness of the conductive layer. For practical reasons, the thickness of the space containing the insulating material is not to be over 1 cm. For portable electronic applications, the thickness is preferably not to be over 1 mm. For various applications, the thickness can be, for example, 1cm, 1 mm, 0.1 mm, 10 µm, 0.1 µm, 10 nm.

Pores of the Porous Electrode

The pores in the porous conductive layer of embodiments of the present invention are the space where an active material can be stored. The pores can be in the form of anything, for example, random-shaped space, rectangular prism, hexagonal prism, cylinder, sphere, pyramid or a combination of any form. The dimensions of the pores close to the insulating layer and the interface is of particular importance. The average dimension of a pore close to the insulating surface side of the porous conductive layer is preferably no more than 100 µm; more preferably, the average dimension of the pores close to the insulating surface side of the porous conductive layer is no more than 10 µm; still more preferably, the average dimension of the pores close to the insulating surface side of the porous conductive layer is no more than 5 µm. On the other hand, the average dimension of the pores close to the insulating surface side of the porous conductive layer is preferably no less than 1 nm; more preferably, the average dimension of the pores close to the insulating surface side of the porous conductive layer is preferably no less than 5 nm. Still more preferably, the average dimension of the pores close to the insulating surface side of the porous conductive layer is no less than 10 nm.

The pores in the porous conductive layer of embodiments of the present invention occupy a significant volume of the porous conductive layer, so more active materials can be stored in a given electrode volume. Preferably, the pore volume is no less than 50% of the total volume of the porous conducive layer. More preferably, the pore volume is no less than 75% of the total volume of the porous conducive layer.

The pores in the porous conductive layer of embodiments of the present invention may be empty, partially filled or filled, with active materials, with liquid electrolytes, with gel electrolyte, with solid electrolyte, with composite electrolyte, or any combination of the above.

Uncovered Top Conductive Surface of the Porous Conductive Layer

The top conductive surface of the porous conductive layer broadly refers to the surface of the conductive material that is close to or in contact with the insulating layer and faces toward the direction of the insulating layer. The exact thickness of the conductive layer that is considered part of the top conductive surface may depend on the diameter of the pores of the conductive layer that borders the insulating layer. Generally, the bigger the pore diameter, the thicker the portion of the conductive layer would be considered containing the top conductive surface. For example, for a pore diameter of 2 µm, the surface of the conductive material that locates within 1.5 µm of the porous conductive layer bordering the insulating layer may be considered the top conductive surface; for a pore diameter of 5 µm, the surface of the conductive material that locates within 2.5 µm of the porous conductive layer bordering the insulating layer may be considered the top conductive surface. Any uncovered top conductive surface would provide preferential sites for dendrite growth. Ideally, the insulating material should cover the entire top conductive surface of the porous conductive layer. Practically, there may be some uncovered top conductive surface left.

The insulating material may cover only the very top of the conductive layer, whereas the uncovered top surface area of the conductive element is no more than 50% of the available top surface area of the conductive elements. Preferably, the uncovered top surface area of the conductive element is less than 10% of the available top surface area of the conductive elements. More preferably, the uncovered top surface area of the conductive element is less than 1% of the available top surface area of the conductive elements.

The insulating material coverage may extend farther to the inside of the conductive layer, wherein the thickness of the covered portion of the conductive layer is preferably less than 50% of the total conductive layer thickness. More preferably, the thickness of the covered portion of the conductive layer is less than 25% of the total conductive layer thickness.

Optional Components of the Porous Electrode

Active metal, such as lithium, sodium, zinc, magnesium or aluminum, may or may not be present in the porous electrode. When the active metal is not present, the active metal may be deposited into the electrode after assembly of the electrochemical cell. When the active metal is present, it may be either: stacked under the porous conductive layer, or impregnated inside the pores of the porous conductive layer.

Additional current collectors may or may not be present. When it is present, it can be either in the form of solid sheet, mesh or foam.

Method of Forming the Porous Electrode and Use Thereafter

Another aspect of the present invention pertains to the method of forming the porous electrode. The layers of the electrode of embodiments of the present invention may be formed by any of the methods, such as, but not limited to physical deposition methods, chemical vapor deposition methods, electrostatic spray deposition, mechanical forming methods including extrusion, winding and molding, chemical or electrochemical stripping or plating, or printing methods including 2D and 3D printing. Low cost methods are generally preferred.

One more aspect of the present invention pertains to any use of the porous electrode. In one or more embodiments of the present invention, the porous electrode is incorporated as an anode or part of the anode into an electrochemical cell that includes an anode, a cathode, a separator and an electrolyte. In an alternative embodiment of the present invention, the porous electrode is incorporated as an anode or part of the anode into an electrochemical cell that includes an anode, a cathode, and an electrolyte.

In an alternative embodiment of the present invention, lithium metal is attached to the porous electrode before being assembled into an electrochemical cell.

In alternative embodiments of the present invention, lithium or sodium metal is deposited in-situ to the porous electrode after the electrode is assembled into an electrochemical cell.

The electrode of embodiments of the present invention when incorporated into an electrochemical cell enables the active metal to be stored inside the pores and inhibit the preferential growth of active metal dendrite during charging. The electrochemical cells containing embodiments of the present invention have high energy density, good cycle life, experience little volume change during operation, and/or have improved safety.

EXAMPLES

Several embodiments of the present invention are described in the following examples, which are offered by way of illustration and not by way of limitation.

Figure 1:
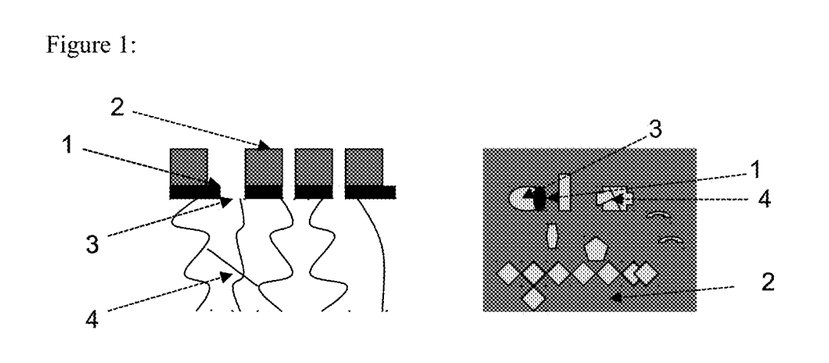
FIG. 1 illustrates cross-sectional (left) and top (right) views of a part of the porous electrode of an embodiment of the present invention, where the insulation layer is on top of the conductive layer with random pores. 1: an uncovered top conductive material surface; 2: insulating layer; 3: a pore close to the insulating surface side of the porous conductive layer; 4: inner conductive material.

Example 1: In one embodiment, a thin copper foil is first press fixed onto a platinum foil face to face and then attached to the working terminal of a potentiostat/galvanostat. The foils are then immersed into a $CuSO4/H_2SO_4$ aqueous solution. After setting up the platinum counter electrode and Ag/AgCl reference electrode, positive current pulse is applied to the copper foil to randomly strip copper and thus a porous copper foil is obtained. The perforated copper foil is then separated from the platinum foil and one side protected with a Scotch tape and attached again to the working terminal of the potentiostat/galvanostat. Negative current pulse is then applied to the copper foil and random copper is grown onto the perforated copper foil. Thus a porous conductive layer made of copper is obtained. The porous copper foil is introduced into a physical vapor deposition chamber as the substrate together with a LiF target. After the desirable vacuum is obtained, LiF is deposited onto the copper mesh. A porous electrode as illustrated in FIG. 1 is thus prepared.

Figure 2:
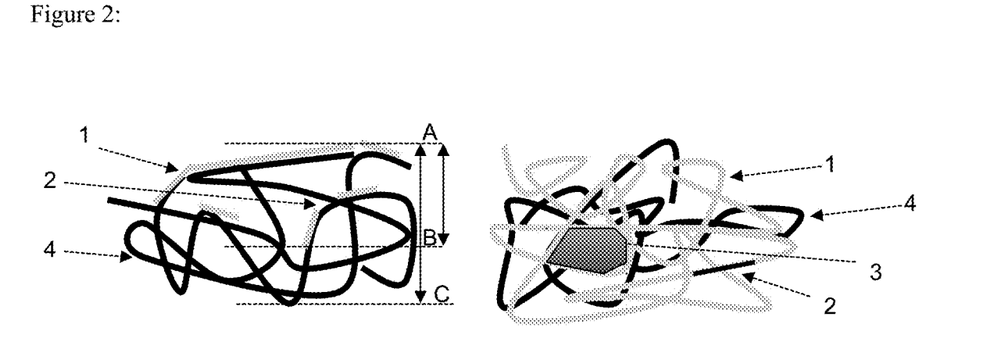
FIG. 2 illustrates cross-sectional (left) and top (right) views of a part of the porous electrode of an embodiment of the present invention, where the insulation layer extends deeper into the conductive layer with random pores. 1: an insulation material covered on top of the conductive material surface; 2: an uncovered top conductive material surface; 3: a pore close to the insulating surface side of the porous conductive layer; 4: inner conductive material without insulation coverage; Line AB: thickness of the space containing the insulation material; Line AC: thickness of the total conductive layer.

Example 2: In an alternative embodiment, a loose fine copper wire pile with thickness of 10 cm is dipped into a melted PE pan of 1 cm deep. Then the copper wire was allowed to cool slowly so that PE uniformly covers one tenth of the copper wire piles thickness. The copper wire pile was then pressed into a thickness of 1 cm. Thus a porous electrode as illustrated in FIG. 2 is prepared.

Figure 3:
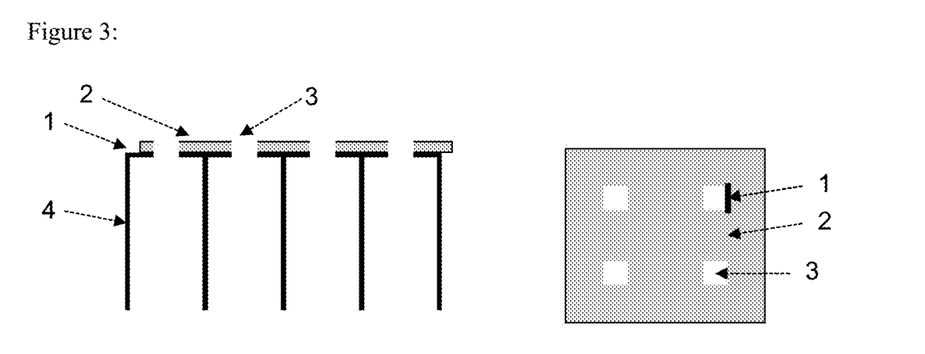
FIG. 3 illustrates cross-sectional (left) and top (right) views of a part of the porous electrode of an embodiment of the present invention, where the insulation layer is on top of the conductive layer with patterned pores. 1: an uncovered top conductive material surface; 2: insulating layer; 3: a pore close to the insulating surface side of the porous conductive layer; 4: inner conductive material.

Example 3: In an alternative embodiment, a nickel mesh with average top layer pore size less than 10 μm is introduced into a physical vapor deposition chamber as the substrate together with a LiF target. After the desirable vacuum is obtained, LiF is deposited onto the nickel mesh. Thus a porous electrode as illustrated in FIG. 3 is prepared.

Example 4: In an alternative embodiment, a brass alloy sheet of 50 μm is immersed in a 1M HCl solution until no gas bubble is generated. The sheet is then connected to the ground terminal of an electrostatic spray deposition chamber and is heated to 250° C. A 10 kV is applied on the metal needle connected to a vial of PVDF solution and the copper sheet is coated for 5 minutes. Thus a porous electrode as illustrated to FIG. 1 is prepared.

Figure 4:
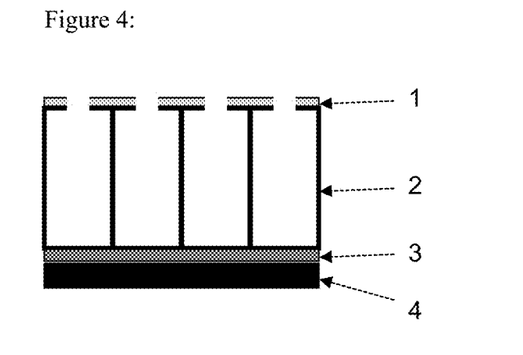
FIG. 4 illustrates a cross-sectional view of a porous electrode of an embodiment of the present invention, where active metal is sandwiched between additional current collector and an above-mentioned structure. 1: insulating layer (uncovered top conductive surface may or may not exist); 2: porous conductive layer; 3: active metal layer (lithium, zinc, aluminum, sodium, etc.); 4: additional current collector.

Example 5: In an alternative embodiment, a porous electrode from example 3 is stacked on top of a lithium foil and copper foil. Thus a porous electrode as illustrated in FIG. 4 is prepared.

Figure 5:
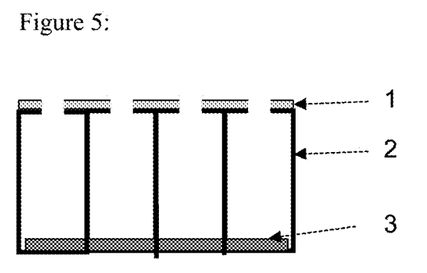
FIG. 5 illustrates a cross-sectional view of a porous electrode of an embodiment of the present invention, where active metal is embedded inside the pores of an above-mentioned structure without additional current collector. 1: insulating layer (uncovered top conductive surface may or may not exist); 2: porous conductive layer; 3: Active metal (lithium, zinc, aluminum, sodium, etc.) impregnated inside the pores of the porous conductive layer. No additional current collector is needed.

Example 6: In an alternative embodiment, a porous electrode from example 3 is introduced into a vacuum chamber and placed upside down as the substrate. Lithium was then deposited onto the bottom surface and pores of the nickel mesh. Thus a porous electrode as illustrated in FIG. 5 is prepared.

Figure 6:
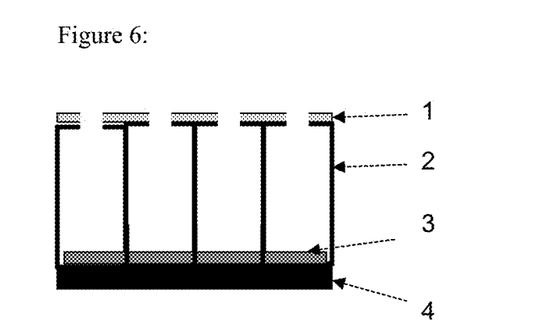
FIG. 6 illustrates a cross-sectional view of a porous electrode of an embodiment of the present invention, where an above-mentioned structure and additional current collector are combined. 1: insulating layer (uncovered top conductive surface may or may not exist); 2: porous conductive layer; 3: active metal (lithium, zinc, aluminum, sodium, etc.) impregnated inside the pores of the porous conductive layer; 4: additional current collector.

Example 7: In an alternative embodiment, a porous electrode from example 6 stacked onto a nickel foil. Thus a porous electrode as illustrated in FIG. 6 is prepared.

Figure 7:
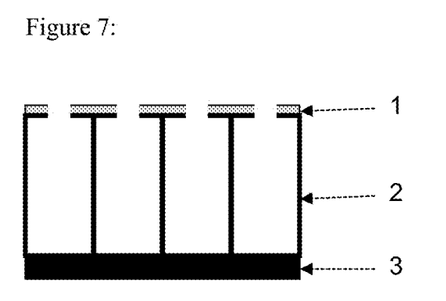

Example 8: In an alternative embodiment, a porous electrode from example 3 is stacked on top of copper foil. Thus a porous electrode as illustrated in FIG. 7 is prepared.

Example 9: In an alternative embodiment, a porous electrode from example 3 is stacked on top of an aluminum foil and nickel foil. Thus a porous electrode as illustrated in FIG. 4 is prepared.

Example 10: In an alternative embodiment, a porous electrode from example 3 is stacked on top of a zinc foil and nickel foil. Thus a porous electrode as illustrated in FIG. 4 is prepared.

Figure 8:
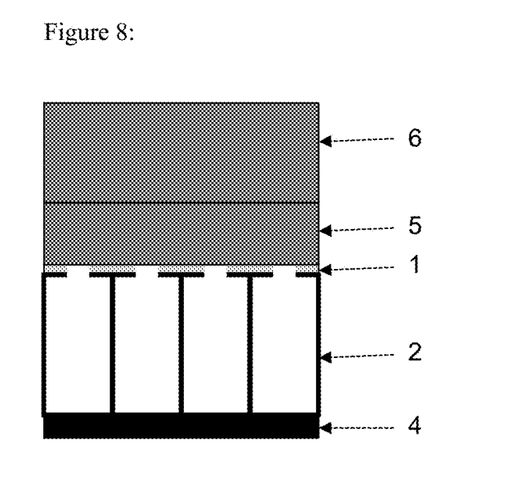
FIG. 8 illustrates a cross-sectional view of the active material assembly of an electrochemical cell of an embodiment of the present invention. 1: insulating layer (uncovered top conductive surface may or may not exist); 2: porous conductive layer; active metal (lithium, zinc, aluminum, sodium, etc.) would be deposited in-situ after assembling of the electrochemical cell. 4: additional current collector. 5: separator layer. 6: cathode layer.

Example 11: In an alternative embodiment, a porous electrode from example 7 is cut into a rectangular shape with a tab, then stacked with a PP separator and an $LiNi_{0.6}Co_{0.2}Mn_{0.2}O_2$ based cathode sheet of the matching shape and size. Thus an active material assembly stack as illustrated in FIG. 8 is prepared. The stack is then partially sealed inside a pouch bag with attached tabs sticking out. 1M LiPF6 in EC/EMC 3/7 v is then added to the pouch bag and the pouch bag is finally vacuum sealed in a dry room. An electrochemical cell of an embodiment of the present invention is thus prepared.

Figure 9:
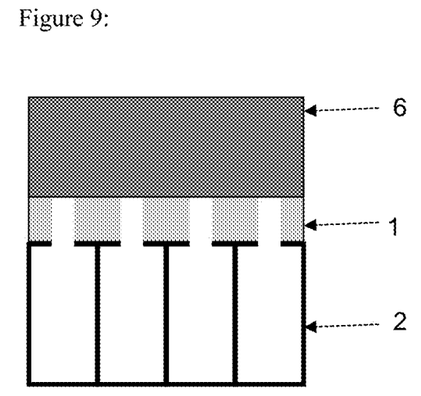

Example 12: In an alternative embodiment, a porous electrode from example 3 is cut into a rectangular shape with a tab, then stacked with an LiFePO4 based cathode sheet of the matching shape and size. Thus an active material assembly stack as illustrated in FIG. 9 is prepared. The stack is then partially sealed inside a pouch bag with attached tabs sticking out. 2M LiFSI in EC/PC 1/1v is then added to the pouch bag and the pouch bag is finally vacuum sealed in a dry room. An electrochemical cell of an embodiment of the present invention is thus prepared.

Example 13: In an alternative embodiment, a porous electrode from example 3 is cut into a circular shape with a tab, then stacked with an $LiMn_2O_4$ based cathode sheet of the matching shape and size. Thus an active material assembly stack as illustrated in FIG. 9 is prepared. The stack is then partially sealed inside a pouch bag with attached tabs sticking out. 1.2M LiPF6 in EC/EMC 3/7 v is then added to the pouch bag and the pouch bag is finally vacuum sealed in a dry room. An electrochemical cell of an embodiment of the present invention is thus prepared.

Example 14: In an alternative embodiment, a porous electrode from example 3 is cut into a rectangular shape with a tab, then stacked with an LiCoO2 based cathode sheet of the matching shape and size. Thus an active material assembly stack as illustrated in FIG. 9 is prepared. The stack is then partially sealed inside a pouch bag with attached tabs sticking out. 3M LiPF6 in EC/EMC 1/1 v is then added to the pouch bag and the pouch bag is finally vacuum sealed in a dry room. An electrochemical cell of an embodiment of the present invention is thus prepared.

Example 15: In an alternative embodiment, a porous electrode from example 3 is cut into a rectangular shape with a tab, then stacked with a $Na_2FePO_4F$ based cathode sheet of the matching shape and size. Thus an active material assembly stack as illustrated in FIG. 9 is prepared. The stack is then partially sealed inside a pouch bag with attached tabs sticking out. 2M NaPF6 in EC/EMC 1/1 v is then added to the pouch bag and the pouch bag is finally vacuum sealed in a dry room. An electrochemical cell of an embodiment of the present invention is thus prepared.

Example 16: In an alternative embodiment, a porous electrode from example 3 is cut into a rectangular shape with a tab, then stacked with a $LiCoO_2$ based cathode sheet of the matching shape and size. Thus an active material assembly stack as illustrated in FIG. 9 is prepared. The stack is then partially sealed inside a pouch bag with attached tabs sticking out. 1M LiPF6 in EC/EMC 1/1 v solution with 6% wt (by weight) of methyl methacrylate (MMA) and 0.1% wt AIBN (initiator) is then added to the pouch bag and the pouch bag is finally vacuum sealed in a dry room. The pouch bag is then stored at 60° C. for 12 hours and so that MMA is polymerized and the electrolyte in the pores becomes solid. An electrochemical cell of an embodiment of the present invention is thus prepared.

The electrochemical cells that contain embodiments of the present invention have good cycle life, experience small volume change during operation, and/or have good safety performance.

What is claimed is:

1. A porous electrode comprising:
   a porous conductive layer comprising: at least one conductive material; and pores formed by the at least one conductive material; wherein an electrical conductivity of the at least one conductive material is no less than $10^{-6}$ S/cm and the pores are at least partially filled with active materials, with liquid electrolyte, with gel electrolyte, with solid electrolyte, with composite electrolyte, or with a combination of the above materials;
   wherein the at least one conductive material is in a form selected from the group consisting of a wire, ribbon, tube, mesh, foam, or random arrangement;
   an insulating layer comprising at least one insulating material that is characterized as both electronically and ionically non-conductive and selected from the group consisting of polymers, oxides, sulfides, fluorides, chlorides, carbonates, nitrides, silicates, borates, aluminates, sulfates, phosphates and mixed compounds and composites;
   wherein the at least one insulating material partially covers a top conductive surface area of the porous conductive layer so that the pores of the porous conductive layer are not closed by the at least one insulating material and an uncovered top conductive surface area is less than 10% of the top conductive surface area of the porous conductive layer;
   wherein a coverage by the at least one insulating material extends inside the porous conductive layer;
   wherein a volume of the pores formed by the at least one conductive material is no less than 50% of a total volume of the porous conductive layer; and
   wherein when the porous electrode is incorporated as an anode or part of an anode in an electrochemical cell, the insulating layer is between the porous conductive layer and a cathode.

2. The porous electrode according to claim 1, wherein the uncovered top conductive surface area is less than 1% of the top conductive surface area of the porous conductive layer.

3. The porous electrode according to claim 1, wherein a thickness of the insulating layer is less than the thickness of the porous conductive layer.

4. The porous electrode according to claim 1, wherein the at least one conductive material is selected from the group consisting of copper, nickel, iron, carbon, or their composites.

5. The porous electrode according to claim 1, wherein an average dimension of the pores of the porous conductive layer is between 1 nm and 100 µm.

6. The porous electrode according to claim 1, wherein the pores of the porous conductive layer close to the insulating layer are partially or completely filled with gel or solid electrolyte.

7. The porous electrode according to claim 6, wherein the pores of the porous conductive layer close to the insulating layer are partially or completely filled with solid electrolyte.

8. The porous electrode according to claim 1, wherein
   a volume of the pores formed by the at least one conductive material is no less than 80% of a total volume of the porous conductive layer.

9. The porous electrode according to claim 1, wherein the at least one insulating material is a polymer selected from the group consisting of polyethylene (PE), polypropylene (PP), polystyrene (PS), polytetrafluoroethylene (PTFE), polyvinyldifluoride (PVDF), polyacrylic acid (including its esters) (PAA), poly amide (PA), polyester (PES) and poly (terephthalate) (PT).

10. The porous electrode according to claim 1, wherein the at least one insulating material is made of ceramics selected from the group consisting of LiF, Li2O, Li2S, Li2CO3, Li3PO4, LiPO2F2, Al2O3, AlF3, AlPO4, ZnF2, and Zn3(PO4)2.

11. The porous electrode according to claim 1, wherein the porous electrode further comprises an active metal selected from the group consisting of lithium, sodium, aluminum, magnesium and zinc.

12. The porous electrode according to claim 1, wherein the porous electrode further comprises lithium metal.

13. The porous electrode according to claim 11, wherein the porous electrode comprises aluminum metal.

14. The porous electrode according to claim 11, wherein the porous electrode comprises zinc metal.

15. A method of preparing the porous electrode according to claim 1, which includes physical deposition methods, chemical vapor deposition methods, electrostatic spray deposition methods, mechanical forming methods, chemical or electrochemical stripping or plating methods, and 2D and 3D printing methods.

16. An electrochemical cell that comprises a cathode, an electrolyte, and the porous electrode according to claim 1.

17. The porous electrode according to claim 1, wherein the at least one insulating material covers an entire top conductive surface area of the porous conductive layer.

18. The electrochemical cell according to claim 16, wherein the electrochemical cell further comprises a separator.

19. The electrochemical cell according to claim 16, wherein the porous electrode further comprises an active metal selected from the group consisting of lithium, sodium, aluminum, magnesium, and zinc.

20. The electrochemical cell according to claim 19, wherein the pores of the porous conductive layer are at least partially filled with solid electrolyte.

\* \* \* \* \*